Aug. 10, 1937.  C. W. CHAMBERLAIN  2,089,467
REFRIGERANT BRINE
Filed Jan. 22, 1934    2 Sheets-Sheet 1
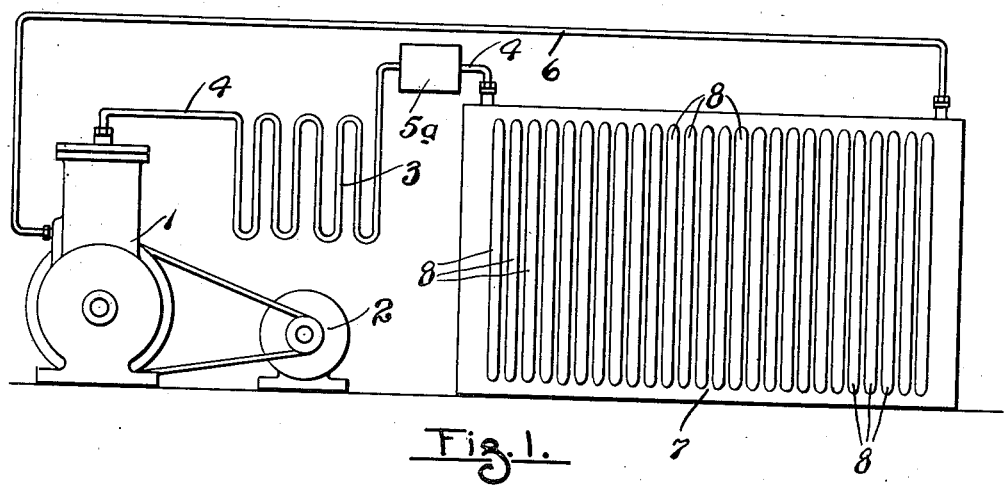
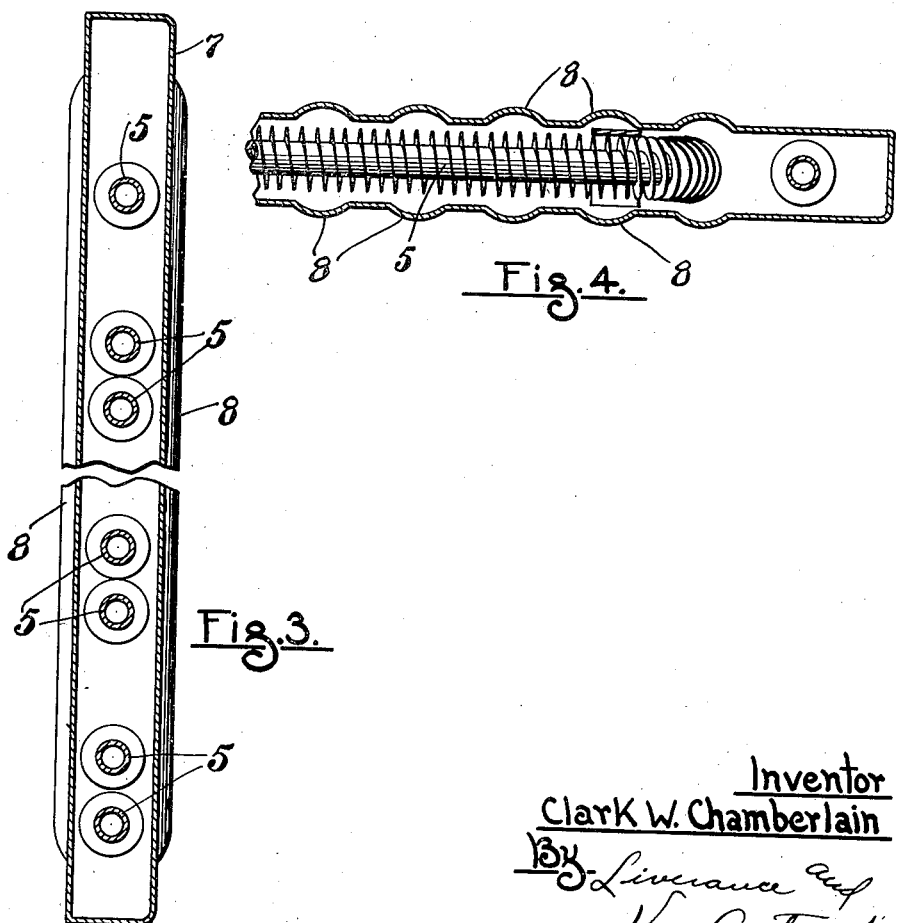
Inventor
Clark W. Chamberlain
By Liverance and
Van Antwerp
Attorneys

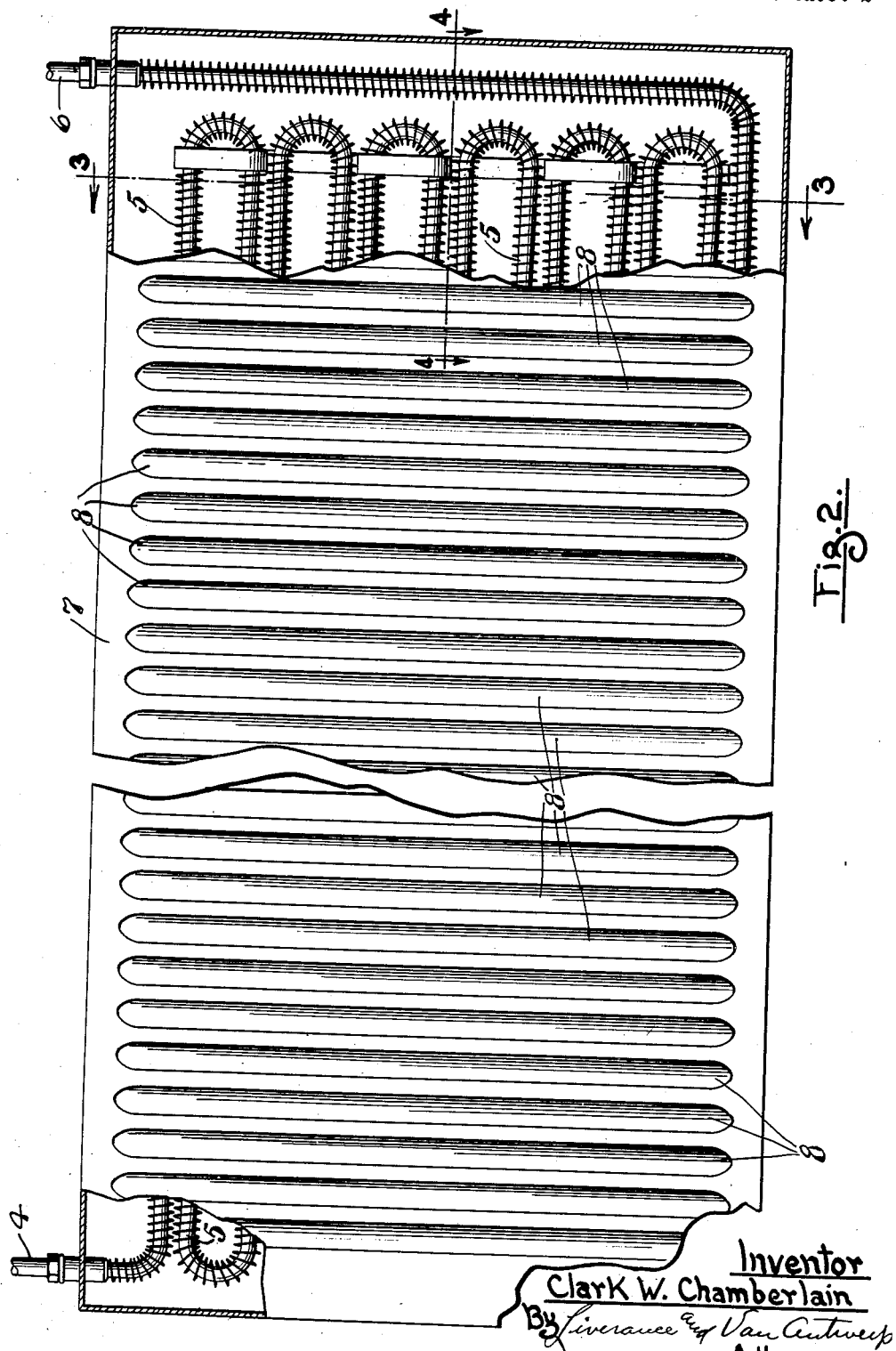

Patented Aug. 10, 1937

2,089,467

UNITED STATES PATENT OFFICE 2,089,467

REFRIGERANT BRINE

Clark W. Chamberlain, Lansing, Mich., assignor to Kold-Hold Manufacturing Company, Lansing, Mich., a corporation of Michigan Application January 22, 1934, Serial No. 707,623

3 Claims. (Cl. 252—5)

The present invention relates to refrigeration, and is more specifically concerned with a method and means of maintaining a substantially constant temperature by mechanical refrigeration and, particularly, temperatures below 32° F., which low temperatures are required for the preservation of food and other materials either in storage or during transport thereof.

One very important phase of the present invention is the maintenance of a refrigerated compartment at a substantially uniform temperature below 32° F. both during the operation of the mechanical refrigeration plant and at the times when the compressor of the refrigerating unit is idle.

The utilization of freezable liquids which freeze at low temperatures, or below 32° F., is known in refrigeration, but such liquids or like materials known as cryogens are subject to numerous objections particularly in continued use in that the cryogen does not stay at its initial composition, but is affected by the alternate freezing and thawing thereof, this at times resulting in separation of its constituents and a settling out of some parts thereof which changes the effective temperature at which the cryogen will freeze, and also at which it will melt. One very important object of the present invention is the production of a true cryohydrate which is suitable for purposes of storing refrigeration at a constant temperature below 32° F., which has a large latent heat of fusion, and which will not be subject to changes in composition, mechanical or otherwise, such that the selected temperature below 32° F. at which it changes from liquid to ice will not appreciably change or vary in long continued use.

A further object of the invention is concerned with a method of producing a true cryohydrate with which a certain predetermined temperature below 32° F. is strictly maintained through the method of producing the cryogen which I have discovered. This results in an ability to provide refrigeration storage at a constant temperature and of constant capacity not subject to appreciable change or variation.

A yet further object of my invention is to provide means for insuring that the liquid cryogen will freeze and solidify at the desired low temperature below 32° F., and will not super-cool to a temperature below the predetermined temperature wanted.

These and various other objects and purposes of the invention will be apparent from the following description taken in connection with the accompanying drawings, in which, Fig. 1 is a diagrammatic elevation illustrating generally a mechanical refrigerating system.

Fig. 2 is an enlarged side elevation, partly broken away and in section, of a preferred refrigerating unit, it however, being understood that the invention is in no sense limited to any particular mechanical refrigerating system or refrigerating unit.

Fig. 3 is a vertical section substantially on the plane of line 3—3 of Fig. 2, and Fig. 4 is a fragmentary horizontal section on the plane of line 4—4 of Fig. 2.

Like reference characters refer to like parts in the different figures of the drawings.

The drawings illustrate diagrammatically a mechanical refrigerating system. The mechanism shown is no part of the present invention but is for the purpose of illustrating and explaining and rendering more clear the invention which I have made.

In the drawings, the mechanical refrigerating mechanism illustrated may include a compressor 1 of suitable design, driven by a motor 2 or other prime mover, and connected with a condenser 3 interposed in an outlet pipe 4 from the compressor which leads to an evaporator, indicated at 5 and with a suitable expansion device 5a between the compressor and evaporator. The pipe 4 connects at one end of the evaporator 5 through an expansion valve and a return pipe 6 leads from the other end back to the compressor. The evaporator 5 is shown as a pipe coil bent back and forth and preferably having a radiating fin helically around it the full length of the evaporator pipes. It is housed within a receptacle 7 having pressed out ribs 8. This receptacle, as shown, has substantially parallel sides which are connected together at their top and bottom and ends, making a closed receptacle in which the evaporator is contained; and the receptacle is substantially filled with a cryogen in which the evaporator is immersed. The cryogen is adapted to be frozen in whole or in part at a temperature below 32° F. during the operation of the compressor and to return to a liquid condition through absorption of heat during times that the compressor is not in operation.

There, of course, may be one or more of said receptacles 7 each containing a suitable evaporator. The receptacles also may be of different shapes and dimensions and the evaporators therein built to correspond.

A cryogen should have a high latent heat of fusion. Water is the most perfect example, so far as latent heat of fusion is concerned, and it has the greatest capacity of giving off heat in freezing; and the ice formed by freezing water has the greatest capacity of absorbing heat in melting. The temperature at which ice freezes, 32° F., however, is not low enough for the majority of refrigeration demands. This has made it necessary to find other cryogens for the desired temperatures below 32° F., which temperatures may need to be even below zero F.

The cryogen which I use and which fills the space between the walls of the receptacle 7 and around the evaporator 5 is prepared by mixing a solvent with one or more solutes in such proportion that the resulting solution is saturated at its freezing temperature. The solution, using water as a solvent, is not saturated at room temperature, nor at 32° F., not at any other temperature than at the point where it will begin to solidify into a true cryohydrate. The amount of the solute which is put in the solvent is just sufficient that the resulting cryogen will be at the saturation point when the freezing point for such cryogen is reached. The invention which I have made in the production of a cryogen therefore is directed to using exactly the right amount of solute in the solvent that for a temperature at which the cryogen freezes into solid the solvent will be saturated by the solute used.

It is well known that the freezing point of a solution can be lowered by increasing the number of particles of solute in a given volume at a given temperature. This can be done by the addition of one or more solutes. When such a solution is cooled its temperature falls until its freezing point is reached. The amount by which the freezing point is lowered depends on the solute used and the concentration of the solution. Water being the ordinary and well known solvent of cryogens used in refrigeration, a solution of a solute in water, for example, common salt in water, provides a cryogen which, as heat is removed from the solution and the temperature lowered, upon the freezing point of the cryogen being reached, pure water ice is formed. What remains of the solution increases in concentration, thus still further depressing the freezing point of the remaining liquid. This occurs if the solution has a smaller amount of the solute than is necessary for saturation. With such type of cryogen a further extraction of heat at the still lower temperature of the remaining liquid, after the first water ice has been formed, causes a production of still further water ice and a further concentration of the solution until a point is reached at which the solution is concentrated. Such last temperature point reached is called the eutectic temperature; and at such temperature the ice, the solute and the solution are in equilibrium. Thereafter a further extraction of heat causes the formation of solid cryohydrate which has a fixed melting point and which is now known to be a mechanical mixture of ice and extremely fine particles of solutes locked within the ice.

If a solution is saturated at 32° F., when cooled below that temperature some of the solute therein is precipitated. The solid particles precipitated tend to collect in the bottom of the receptacle and do not readily go back in solution when the ice is melted by addition of heat in any manner. Repeated melting and freezing of the mixture results in an increase in the amount of pure water ice and a decrease in the amount of true cryohydrate. Attempts to cure this have been made by introducing sawdust, excelsior and the like or by the reduction of the solution to a jelly-like mass by the use of starch in an endeavor to hold the particles of solute in suspension in the cryogen. Such attempts are but make-shifts at best and are not successful. By making the solution of a saturated character at the critical temperature wanted, the eutectic temperature, the cryogen will all change from liquid to a true cryohydrate without the separate formation initially of water ice; and all particles of the solute will remain in the solution without precipitation and without the necessity of stirring or the use of the expedients described to again get the solute back into solution upon the addition of heat.

For certain commercial purposes it is desired many times to maintain different compartments at different temperatures thus requiring a different solution for each. True cryohydrates which are saturated at their freezing temperature but which solidify at different temperatures or freezing points can be formed by the use of solvent and one or more solutes mixed in varying proportions. Likewise, the same solvent and solute mixed in varying proportions may have more than one eutectic temperature. For example, I have found it possible to produce true cryohydrates to cover the entire range of temperatures required in commercial refrigeration using only one solute and water. 22.4 pounds of anhydrous sodium chloride (that is, common salt) dissolved in 76.6 pounds of water will form a true cryohydrate at $-6.2°$ F. Also 23.1 pounds of the same salt dissolved in 76.9 pounds of water will form a true cryohydate at $-8.3°$ F. Neither solution will produce any pure water ice when freezing. And other solutions to form true cryohydrates at other temperatures than those named may be determined by test, always bearing in mind that the saturation of the solvents with the soluble solute must occur at the eutectic temperature of the cryogen formed in order to produce a true cryohydrate.

When solutions which form true cryohydrates upon freezing are cooled rapidly there is tendency to super-cool below the normal freezing point. This is because there are no nuclei around which the solid crystals may begin to form. Such super-cooling may result in so low a vapor pressure in the liquid used as a refrigerating medium as to cause failure of the compressor to function. Super-cooling also causes the temperature of the cryogen to fall below that at which it was saturated whereupon the solution becomes over-saturated and some of the solute precipitated, this leaving the cryogen in a slightly diluted state and permitting the formation of some pure water ice the next time the solution is frozen. I have found that the formation of the troublesome water ice does not take place on rising temperature as has been heretofore generally supposed but takes place when the temperature is falling and may be a result of super-cooling.

I have found that the remedy for this condition is neither saturation at a temperature higher than the eutectic temperature nor the holding of excess solute in suspension by artificial means. I have found that the employment of very minute particles of a foreign substance in the cryogen produces a large number of nuclei around which the solid crystals begin to form. The foreign substance should be of extremely small particles, offering a maximum surface of contact, preferably angular contact, with the liquid. Many materials have been found to serve the purpose.

They should be of a very finely divided character and capable of thorough dissemination and suspension in the cryogen. A small amount of plumbago added to the cryogen and thoroughly stabilized therein by agitation serves the purpose of preventing super-cooling and insures the change of the cryogen to true cryohydrate when the eutectic temperature is reached.

Having thus fully described my discovery and invention, and having in mind the variations from the specific disclosure made which may be resorted to without departing from my invention, I claim my invention as follows:

1. The method of producing a cryogen which consists, in dissolving a solute in a liquid solvent to provide a solution having a predetermined temperature freezing point, the proportions of the solute in the solvent being such that the solution is saturated with the solute at said predetermined freezing point, and disseminating throughout the solution minute non-soluble and non-solvent absorption nuclei of crystallization in finely divided form.

2. A cryogen consisting of common salt dissolved in water to provide a solution having a predetermined temperature freezing point, the proportions of the salt in the water being such that at said temperature freezing point the solution is saturated with the salt, and plumbago finely divided and mixed and thoroughly disseminated in the solution and held therein in suspension.

3. A cryogen consisting of a solid solute dissolved in a solvent therefor to provide a cryogen solution having a predetermined temperature freezing point, the proportions of the solute in the solvent being such that at the said predetermined temperature freezing point the cryogen consists of solvents saturated with the solute, and plumbago finely divided and mixed and thoroughly disseminated with the cryogen and held therein in suspension.

CLARK W. CHAMBERLAIN.